United States Patent [19]

Norman

[11] Patent Number: 4,537,585
[45] Date of Patent: Aug. 27, 1985

[54] CONTINUOUS HEAT SEALER FOR SACKS AND BAGS IN THERMOPLASTIC MATERIAL

[76] Inventor: Rodric H. Norman, 19,Chemin du Blanc Caillou, B-1420 Braine-L'Alleud, Belgium

[21] Appl. No.: 372,444

[22] Filed: Apr. 27, 1982

[30] Foreign Application Priority Data

Apr. 28, 1981 [LU] Luxembourg .............................. 83326

[51] Int. Cl.³ ................................................ B31B 1/64
[52] U.S. Cl. .................................. 493/205; 156/583.5
[58] Field of Search ...................... 156/583.5, 535, 497; 493/205; 53/DIG. 2, 373, 379

[56] References Cited

U.S. PATENT DOCUMENTS

| 3,131,623 | 5/1964 | Seefluth ........................ 156/583.5 X |
| 3,142,608 | 7/1964 | Techtmann et al. ........ 156/583.5 X |
| 3,369,950 | 2/1968 | Rosewicz et al. ............ 156/583.5 X |
| 3,475,257 | 10/1969 | Ludwig et al. ............... 156/583.2 X |
| 3,576,694 | 4/1971 | Greisman ...................... 156/583.5 X |
| 3,953,272 | 4/1976 | Webber ........................... 493/205 X |

FOREIGN PATENT DOCUMENTS

| 736679 | 9/1955 | United Kingdom . |
| 1531858 | 11/1978 | United Kingdom . |
| 1568438 | 5/1980 | United Kingdom . |

*Primary Examiner*—James F. Coan

[57] ABSTRACT

An apparatus for heat sealing of plastic bags having a main assembly for sealing, which includes drive and control means and a removeable heat sealing head having confronting heat transfer means between and in contact with which the bags pass, such that confronting side walls thereof are heat sealed, the heat sealing head constituting a sub-assembly provided with its own drive means and adapted to be received in said main assembly through a single drive means.

12 Claims, 12 Drawing Figures

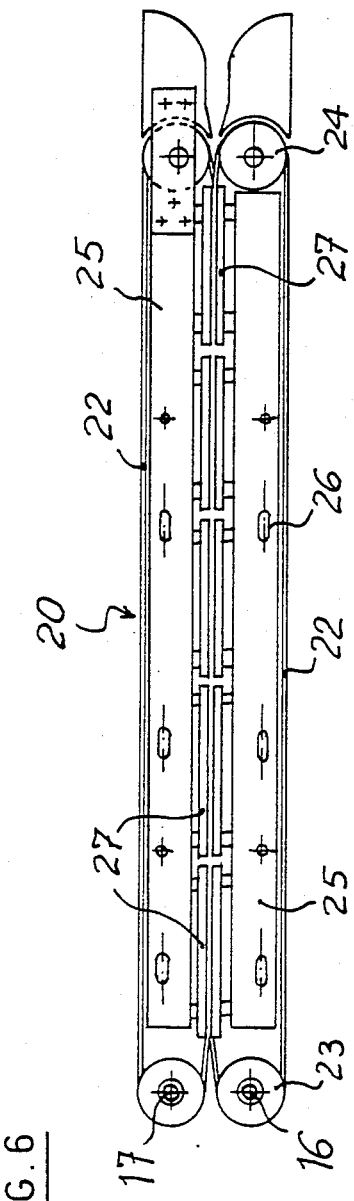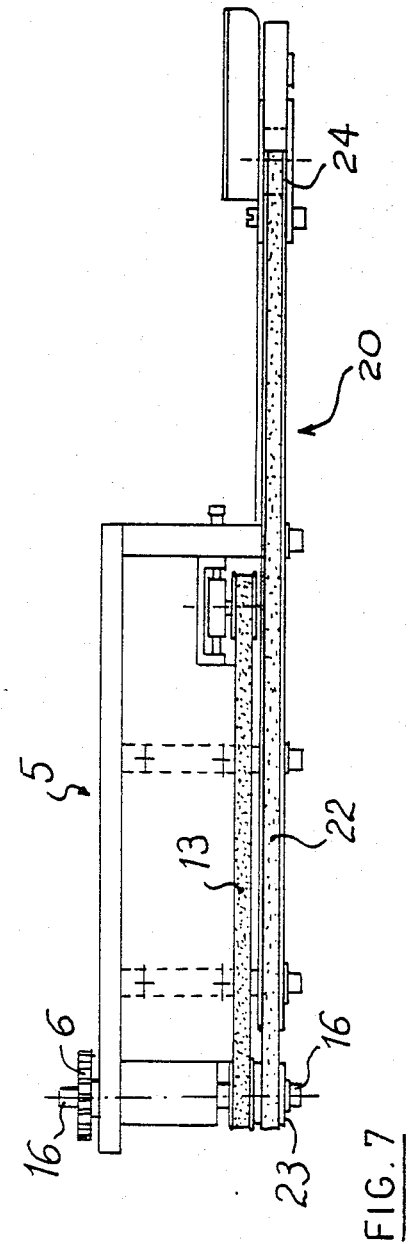

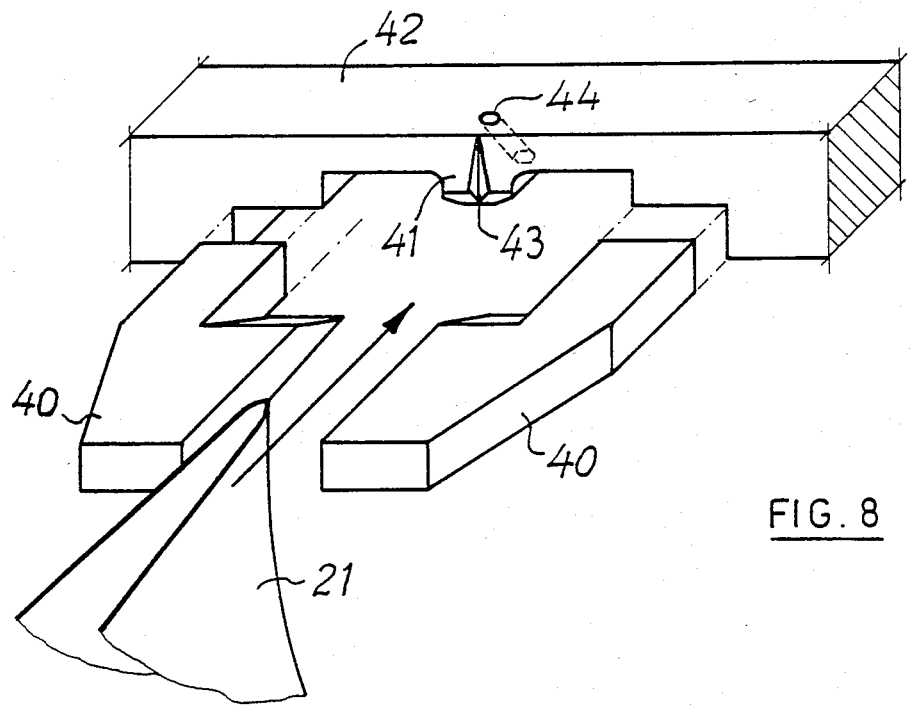
FIG. 8
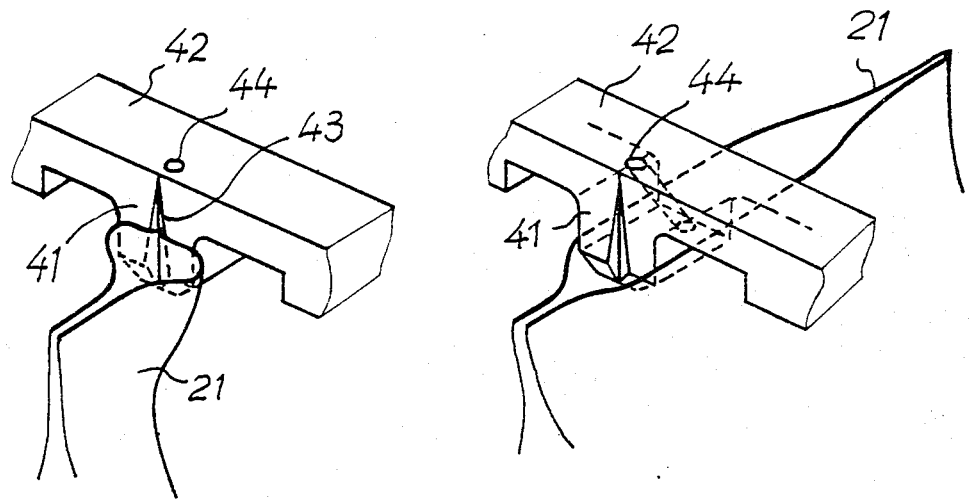
FIG. 9
FIG. 10

CONTINUOUS HEAT SEALER FOR SACKS AND BAGS IN THERMOPLASTIC MATERIAL

The present invention relates to an apparatus for sealing bags of thermoplastic material and has for its object to permit the accommodation of such an apparatus to very different sealing operations depending on the nature and the thickness of the bags intended to be sealed.

One object is to provide a sealing apparatus in which elements thereof may be easily and quickly replaced using a minimum number of accessories.

Figure 1:
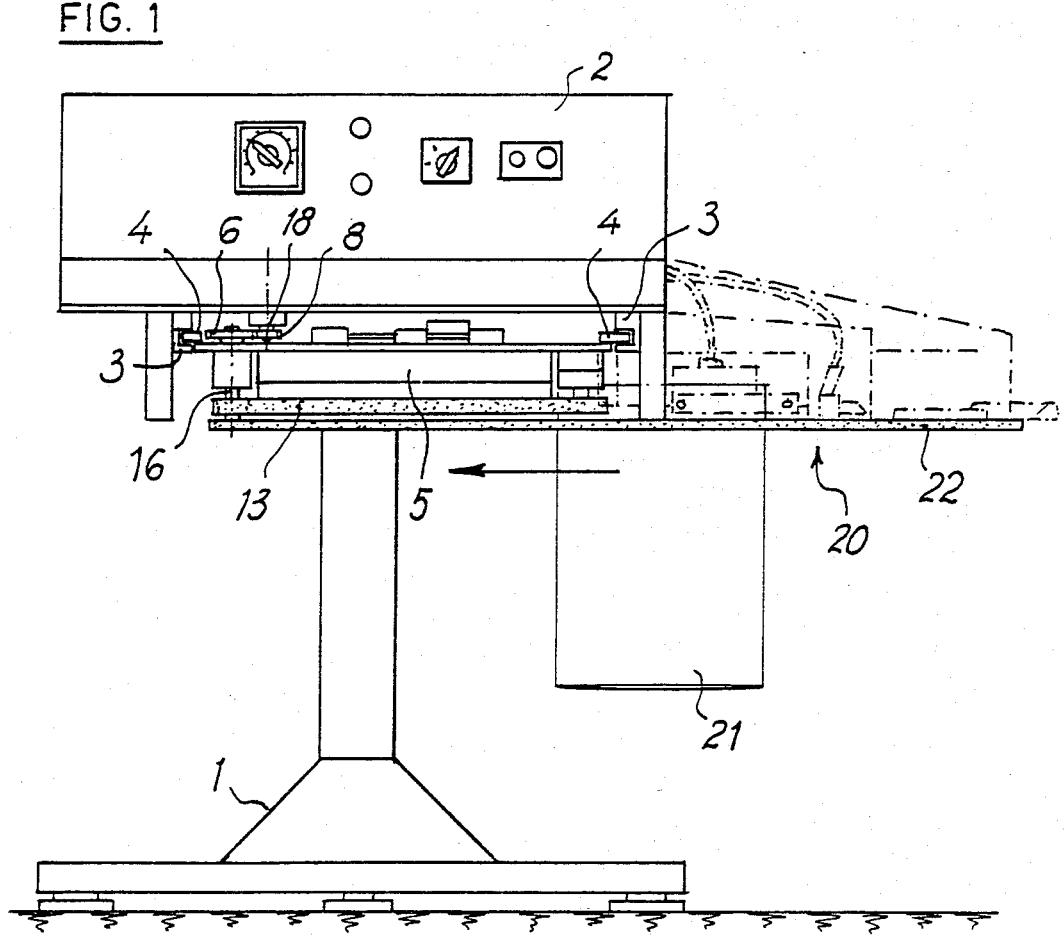
Figure 2:
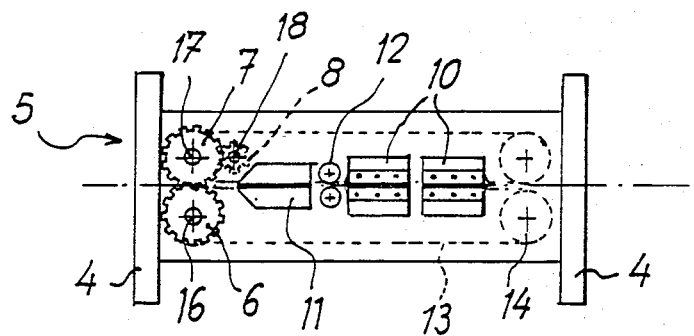
Figure 3:
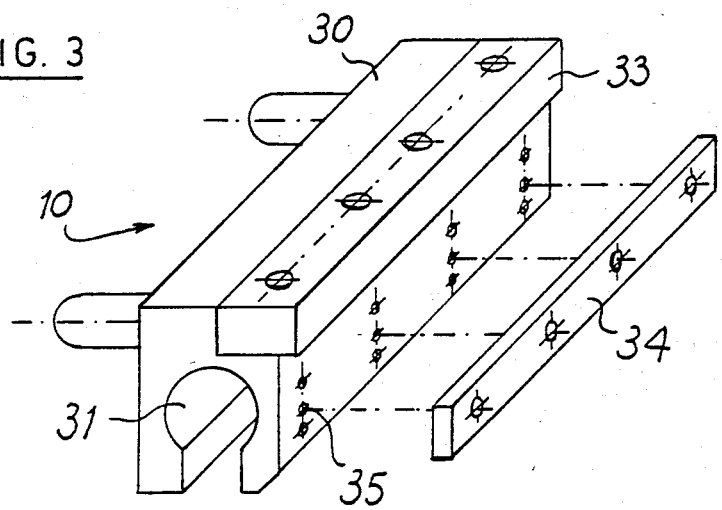
Figure 4:
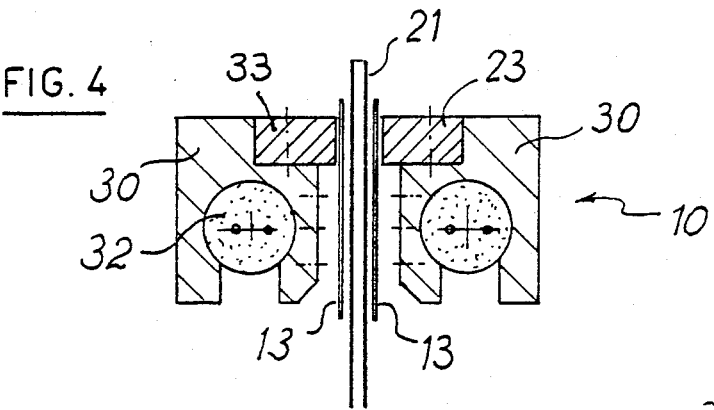
Figure 5A:
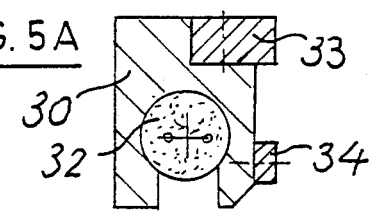
Figure 5B:
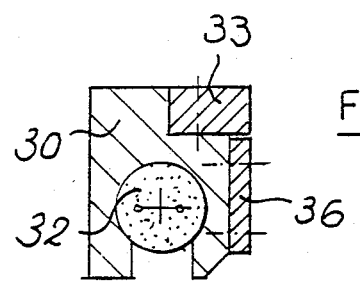
Figure 11:
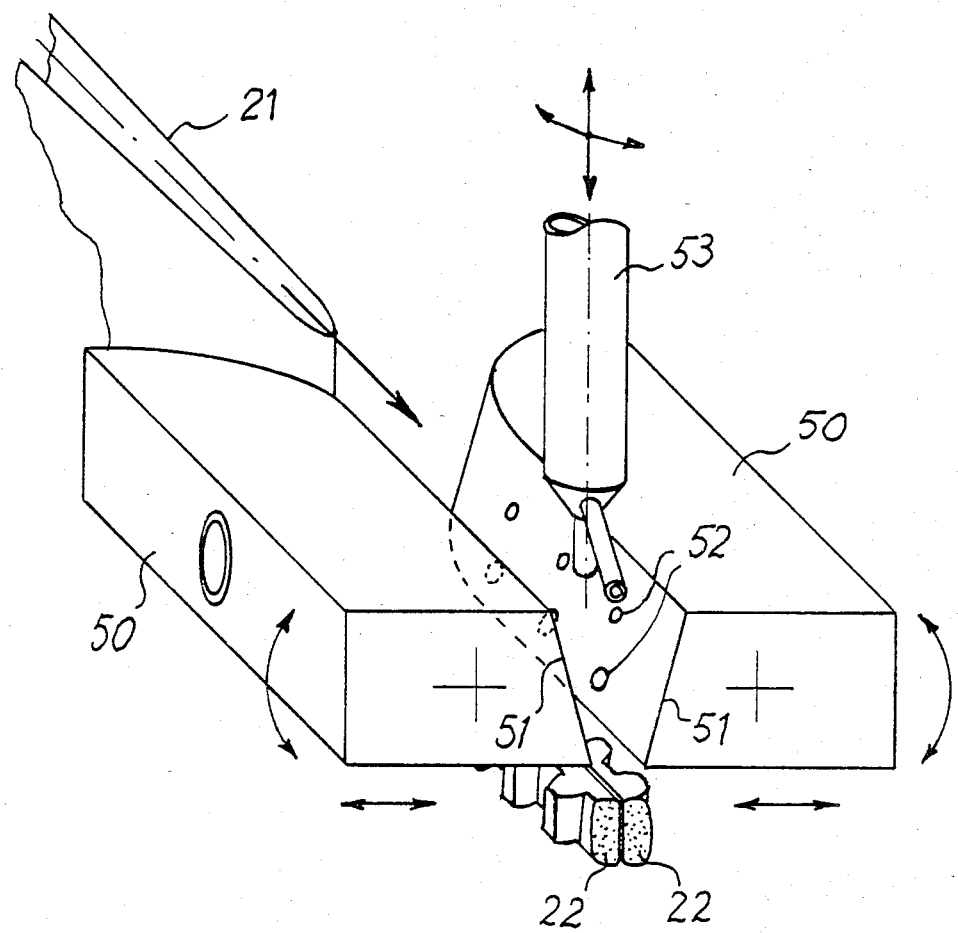

The different features of this invention will be described hereafter referring to the accompanying drawings in which:

FIG. 1 is an elevational view of the whole apparatus;
FIG. 2 is a plan view of a sealing head;
FIG. 3 is a perspective view of a heating means;
FIGS. 4, 5A and 5B are views showing how to modify the shape of the heating means according to its use;
FIG. 6 is a plan view of a driving means adaptable to the sealing head;
FIG. 7 is an elevation view of a driving device according to FIG. 6 mounted on a sealing head;
FIGS. 8 to 10 are views showing a detail of a dust removing device;
FIG. 11 is a perspective view showing the dust removing device.

In FIG. 1, there is shown a continuous heat sealer for thermoplastic materials, comprising a base or pedestal 1 supporting a box 2 containing an electrical control system for the same.

On the bottom of the box 2, slides 3 are fixed crossbars 4 inserted therein carrying a sealing head 5.

Sealing head 5 has a set of components including heating means 10, cooling means 11, compressing roller means 12, coding means, etc. depending on the use as shown in FIG. 2.

Generally the sealing head also is provided with two metal belts or strips 13 covered with an anti-adhesive coating (Teflon), rotating in opposite directions with respect to one another, guided by guide-rollers 14 and driven by shafts 16, 17 secured to gears 6 and 7.

It is important that for each different use or application, the sealing head be easily removed and replaced by another.

With this object in view, each sealing head 5 is constructed in such a way that when it is introduced into the sealing apparatus, its proper driving means such as gears 6 and 7 cooperate with one single driving means such as one pinion 8 integral with a shaft 18 projecting from the bottom of the box 2 of the apparatus (FIG. 2).

The shaft 18 may be driven inside the box 2 by an electrical motor preferably d.c. provided with a speed regulator through driving means known per se for example a speed reduction gearing with bevel gears, a set of gears or a toothed belt system.

Each sealing head 5 also is designed so as to permit the control means 20 to carry away the bags 21 to be sealed.

Such a drive is illustrated more specifically in FIGS. 6 and 7 and substantially comprises two perforated belts 22 rotating in opposite directions. Said belts 22 are driven on the one hand by two wheels 23 connected with the shafts 16 and 17 of the sealing head 5 (FIG. 2) and are tensioned on the other hand by two guiding wheels or rollers 24. The belts 22 move around two supporting plates 25 connected with the sealing head 5 by holes 26. Between the supporting plates 25, there are arranged pressing means 27 which are urged by the action of springs (not shown) against the plastic material to be sealed.

Moreover each sealing head may be provided with heating means 10 with variable profile or shape as shown in FIGS. 3, 4, 5A and 5B.

The heating means 10 comprises a body 30 with a longitudinal bore 31 (FIG. 3) in which a heating resistance element or plug 32 is accommodated (FIGS. 4, 5A and 5B).

The body 30 is provided with a removable sealing bar 33 disposed at a position which is asymmetrical with respect to the body 30.

In addition, the body 30 is provided with a set of threaded holes 35 (FIG. 3) permitting the adaptation of various types of bars 34 and 36 of different widths (34, 36) to be adapted. (FIGS. 5A and 5B) to different heating means and bags to be formed thereby.

In this manner the possibility is given of effecting parallel sealings (FIG. 5A) or very broad sealings (FIG. 5B).

In FIG. 4, two heating elements 10 are shown during the sealing operation.

Both thermoplastic sheets of the bag 21 are compressed between the metal strips 13 (coated with Teflon). At the location of sealing bars 33, the metal strip 13 transmits heat to the plastic material sheet which becomes soft and partly melts or fuses together with the other sheet of the bag.

At the location of the bars 33, the strip undergoes a local wear. Thanks to the unsymmetrical arrangement of the bars, it is possible to turn the metal strip 13 so that its life duration will be doubled.

Such a device is advantageously provided with a dust-removing device as shown on FIGS. 8 to 10.

The upper corner of the bag 21 to be sealed passes between guides 40 and impinges against a projection 41 integral with a cross-beam 42.

An important feature is that the projection 41 is provided in the axis of displacement of the bags with a notch 43 which temporarily retains the upper corner of the bag 21 when it has impinged against the projection 42 during its displacement.

As shown in FIG. 9, in this way the bag is caused to be opened and continues its travel due to the fact that its two upper edges may pass along both sides of the projection 41. At the location of projection 41, the crossbeam is provided with a duct 44 through which air under pressure is introduced in order to blow air against the inner edges of the bag and consequently remove any dust or dirt during the sealing operation.

Another embodiment of dust-removing device is shown in FIG. 11.

As shown the bag 21 is brought by the driving belts between two guide members 50 having slightly inclined inner flanges 51 so as to form to an elongated funnel-shaped passageway.

The inclines flanges 51 are provided with a set of holes 52 of different cross-sectional area which can be closed according to the nature of the bags 21 to be sealed. By internal channels provided in the guide member 50, a slight reduction of pressure can be created at the location of the holes 52 so as to suck each upper edge of the bag against its respective guide. A moveable nozzle 53 is provided which once the bag is open, is inserted between the lips of the bag to blow air into the bag. In combination with its vertical displacement, the nozzle 53 also pivots around the axis of displacement of the bag in order that the nozzle be disengaged during its passage to the back side of the bag 21.

Advantageously these dust-removing devices may be mounted on the driving device as shown in FIG. 1. Other implements such as cutting means, preheating means also may be mounted on the same driving device which in turn may be fixed on each available sealing head.

From the foregoing description, it should be apparent that this invention provides an apparatus for sealing plastic bags with a maximum degree of flexibility to accommodate the nature and thickness of the plastic material of which they are composed and with a minimum change of parts in such apparatus.

It should be understood that various modifications may be brought by the skilled art man to the device which has been described by way of non-limiting example without departing from the boundaries of the invention.

What I claim is:

1. An apparatus for heat sealing together confronting side walls of thermoplastic bags as the bags pass through the apparatus, said apparatus comprising a main assembly including drive and control means for the apparatus, and a heat sealing head having confronting heat transfer means between and in contact with which the bags pass such that confronting sidewalls thereof are heat sealed together, said heat sealing head constituting a sub-assembly which is provided with its own drive means and which is removably fitable to said main-assembly with a single drive connection between the drive means of the main and sub-assemblies to allow replacement of the heat sealing head sub-assembly by another said heat sealing head sub-assembly.

2. Apparatus as claimed in claim 1, wherein said assembly also comprises cooling means, and compressing roller means.

3. Apparatus as claimed in claim 1, wherein said confronting heat transfer means of said sub-assembly comprise heating elements engageable with the confronting runs of two endless belts, which are arranged to engage the respective confronting side walls of the bags and which are drivable by the drive means of the main assembly through said drive connection.

4. Apparatus as claimed in claim 1, wherein the drive means of said main assembly includes a pinion drivingly engageable with gear means on said sub-assembly for driving said endless belts.

5. Apparatus as claimed in claim 1, comprising as endless belt transporting means for transporting said bags through said apparatus, said transporting means being driven by said drive means of said main assembly.

6. Apparatus as claimed in claim 5, wherein said endless belt transporting means comprises respective support plates connected to said sub-assembly and around which said belts run, and pressing means provided between said plates.

7. Apparatus as claimed in claim 1, further comprising dust removing means for removing dust from the surfaces of the confronting side walls to be heat sealed.

8. Apparatus as claimed in claim 7, wherein said dust removing means comprises two guide means for guiding an upper corner of said bag and a projection integral with a cross-beam and arranged in the path of said bag for impingement therewith, said projection being provided with a notch for temporarily restraining said upper corner of the bag when it has impinged against said projection, whereby the bag is caused to open and to continue along its path by passing with its upper edges on respective sides of the projection at a location at which said cross-beam is provided with a duct for directing compressed air against the inner edges of said bag for removing dust and dirt therefrom prior to heat sealing.

9. Apparatus as claimed in claim 7, wherein said dust removing means comprises two guide members between which said bag is fed, said guide members having inclined inner flanges defining a funnel-shaped passage and said inclined inner flanges having suction holes for applying suction to the outer sides of the upper edges of said bag for opening said bag.

10. Apparatus as claimed in claim 9, wherein said holes are of different cross sectional areas and are selectively closeable, whereby the amount of suction applied thereby can be varied.

11. Apparatus as claimed in claim 10, wherein said guide members are provided with respective internal channels communicating with said holes and connectable to a suction means.

12. Apparatus as claimed in claim 9, wherein said dust removing device comprises a nozzle connectable to a source of compressed air and movable between said guide members for directing compressed air against the inner sides of the upper edges of said bag.

* * * * *